US006326415B1

(12) United States Patent
Miklasiewicz et al.

(10) Patent No.: US 6,326,415 B1
(45) Date of Patent: Dec. 4, 2001

(54) UV CURED GLOSSY SUPPORT FOR INK JET RECORDING MATERIAL

(75) Inventors: Alexander J. Miklasiewicz, Holyoke; Son T. Vo, Springfield; Everett Wyman Bennett, Easthampton, all of MA (US)

(73) Assignee: Rexam Graphics Inc., South Hadley, MA (US)

( * ) Notice: Subject to any disclaimer, the term of this patent is extended or adjusted under 35 U.S.C. 154(b) by 0 days.

(21) Appl. No.: 09/368,158

(22) Filed: Aug. 5, 1999

(51) Int. Cl.[7] .................................. C08F 2/50; B41J 2/01; B32B 27/00; B32B 27/30

(52) U.S. Cl. ............................ 522/42; 522/101; 522/104; 522/107; 522/179; 522/178; 522/181; 522/182; 427/533; 427/534; 427/536; 347/1

(58) Field of Search .................................... 522/101, 107, 522/42, 162, 104, 179, 182, 195, 178, 181; 428/195; 347/1, 5, 102, 105; 427/458, 517, 519, 533, 534, 536, 256, 261, 288

(56) References Cited

U.S. PATENT DOCUMENTS 4,649,062 * 3/1987 Kosiorek et al. .
4,935,307 * 6/1990 Iqbal et al. .
4,952,486 * 8/1990 Sack et al. .
4,960,638 * 10/1990 Mukoyoshi et al. .
5,405,678 * 4/1995 Bilodeau .
5,472,757 * 12/1995 Ogawa et al. .
5,780,118 * 7/1998 Tracy et al. .
5,910,359 * 6/1999 Kobayashi et al. .
6,020,032 * 1/2000 Romano, Jr. et al. .
6,089,704 * 7/2000 Burns et al. .

FOREIGN PATENT DOCUMENTS 0 770 493 10/1996 (EP) .

* cited by examiner

*Primary Examiner*—Susan W. Berman
(74) *Attorney, Agent, or Firm*—Burns, Doane, Swecker & Mathis, L.L.P.

(57) ABSTRACT

Provided is a support for an ink jet recording material. The support comprises a substrate and a UV cured resinous coating layer on the substrate, with said resinous coating layer being comprised of a tetrafunctional polyester acrylate, a difunctional acrylic ester, a UV photoinitiator and a polyether.

9 Claims, 1 Drawing Sheet

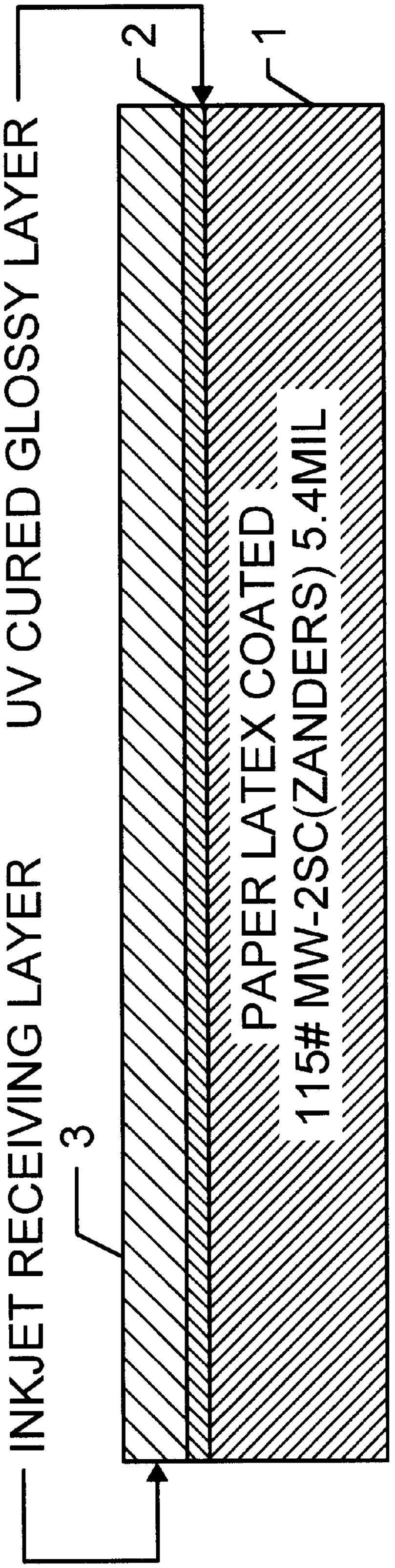
FIGURE

UV CURED GLOSSY SUPPORT FOR INK JET RECORDING MATERIAL

BACKGROUND OF THE INVENTION

1. Field of the Invention

The present invention relates to an ultraviolet (UV) radiation cured, glossy support useful in ink jet recording media. More particularly, the present invention relates to a substrate having a coating comprised of a UV radiation cured, glossy coating. When subjected to corona treatment, the glossy coating in the substrate provides a support layer for aqueous ink jet receiving layers with greatly enhanced adhesion, gloss and thermal processability. The glossy coating also functions excellently with solvent borne coatings without corona treatment, providing excellent adhesion to ink jet media coatings.

2. Description of Related Art

Since the advent of digital photography, the need for media providing photographic quality for ink jet printing applications has risen significantly. Ink jet printing is relatively inexpensive and the imaging can be of photographic quality. The printing resolution is such that, today, it is comparable to silver halide images. Moreover, the total cost of the imaging process, including media, is significantly less. However, the need to develop high quality, inexpensive, digital photographic imaging media for commodity ink jet printing exists.

Currently most of the glossy paper base media which meet this requirement for ink jet receiving layers are of the polyethylene extrusion coated type. These papers normally are comprised of two sided coatings of different molecular weight and density polyethylene. Many of these substrates are limited in gloss value and whiteness, and are costly and sensitive to the thermal processing for subsequent aqueous ink jet layer processing relative to the UV cured chemistry.

The term ink jet-receiving layer refers to the surface or coating on a substrate(paper or film) which receives the ink drops jetting from the printing head of an ink jet printer. Many types of ink jet media are available today (i.e., glossy, matte, canvas, etc.). Today's printing technology affords quality and resolution that yields images that are sharp, colorful and photorealistic. The "new" digital cameras can take images and download them into computers, which in turn can enhance the images and then print the image using ink jet technology on an ink jet glossy media resulting in a photographically realistic reproduction. The desired color image medium must afford silver halide photographic like properties in all its characteristics.

To obtain this photographic like ink jet image, the ink jet media must generally be glossy(>60%@ 20° angle), archivable (non yellowing@3–5 Yr. UV exposure), be water fast (coating does not come off after media exposed to water for 10 min.), must feel (have the hand) of a photograph, and must have excellent adhesion to the substrate. The currently available substrates, which give a high gloss after the coating of the ink jet-receiving layer, must be smooth to yield a glossy appearance. Substrates which have this smoothness are cast coated papers, latex coated papers, subbed polyester films, polyethylene extruded papers, polyethylene extruded/Gelatin subbed papers, and UV or Electron Beam cured coatings on paper.

European Patent Application EP 0 770 493 A1 describes a radiation cured glossy support layer and an ink jet material containing the same. However, many of these substrate surfaces do not meet the gloss requirement of a photograph after the ink jet receiving layers are applied, have poor adhesion to the ink jet receiving layer, are expensive to process, have various coating/drying process limitations, and/or are not archivable (yellowing on light aging 5 years exposure).

The industry is therefore in need of a support which can provide sufficient gloss, have good adhesion to the ink jet receiving layer and has good archival properties for photorealistic ink jet images.

SUMMARY OF THE INVENTION

Accordingly, an objective of the present invention is to provide a coating useful as a glossy support layer for an ink jet-receiving layer, that when applied to a high quality paper substrate will have close to identical photographic paper media properties (Whiteness, Brightness, Color-L*a*b*, Gloss, Yellowing or Fade resistance, and hand). The above objective is realized by a support comprising a substrate and a UV cured resinous coating layer on the substrate, with said resinous coating layer being comprised of a tetrafunctional polyester acrylate, a difunctional acrylic ester, a UV photoinitiator and a polyether. In particular, the media comprises a smooth white latex coated paper substrate with a resinous coating layer formed on the surface of the substrate, and cured by UV radiation. Currently the glossy ink jet paper bases mainly consist of polyethylene (PE) coatings which are applied by hot melt extrusion. In the present invention, the subsequent glossy layer is corona treated before an aqueous ink jet receiving layer is applied due to the low surface energy of the polyethylene. This results in enhanced adhesion to the aqueous ink jet receiving layer.

The UV cured glossy layer composition of the present invention is unique because only UV radiation can successfully cure the system and exposure to corona treatment promotes adhesion to the aqueous ink jet receiving layers. The resulting ink jet medium can be processed at much higher temperatures(>275° F.) than media made with current polyethylene coated substrates as digital ink jet photo bases. Solvent based and solvent modified aqueous coatings usually do not require a corona treatment. In addition, it has been frequently observed that ink jet coatings have much superior wet adhesion to these radiation cured coatings than to gelatin subbed polyethylene coated papers like F. Schoeller RG-250, whereon subbing wet swell can cause adhesion failure.

BRIEF DESCRIPTION OF THE FIGURE OF THE DRAWING

The Figure of the Drawing depicts a preferred embodiment of the present invention.

DESCRIPTION OF PREFERRED EMBODIMENTS

The glossy support layer of the present invention is prepared as a UV curable formulation. The formulation comprises a mixture of a tetrafunctional polyester acrylate, a difunctional acrylic ester, a UV photoinitiator and a polyether. Once the formulation has been applied to the suitable substrate to form the support layer, it is cured with UV radiation, and preferably, subsequently subjected to a corona treatment. It has been discovered that the resulting support has excellent gloss and hand characteristics, and good yellowing/fade resistance. The support also demonstrates excellent adhesion to aqueous based ink jet receiving layers, which are coated over the support.

The coating composition of the present invention is unique in that it consists entirely of polyfunctional polymerizable reactants, i.e., no monofunctional components, and yet is quite flexible. This choice results in a very high crosslink density within the coating (often expressed as moles of crosslinker per kilogram of resin) which is believed to inhibit solvent penetration of this layer, and hence prevent water penetration into the paper substrate, which would result in cockling. The high crosslink density also thwarts solvent swelling or recasting of the layers surface which can result in gloss deterioration.

In the formulation used to prepare the support layer, the tetrafunctional polyesteracrylate and difunctional acrylic ester are very important components. It is the combination of the tetrafunctional and difunctional components which provides the excellent gloss, as well as flexibility and good hand characteristics. Any suitable tetrafunctional polyester acrylate, such as those commercially available, e.g., RCC 13-429 polyester acrylate oligomer available from HENKEL Corp., would be appropriate for use in the present application. The preferred difunctional acrylic ester is an epoxy diacrylate. A preferred example of an epoxy diacrylate is bisphenol A epoxy diacrylate.

The tetrafunctional polyesteracrylate and difunctional acrylic ester are generally employed in the formulation in a weight ratio of tetrafunctional polyester acrylate to difunctional acrylic ester which ranges from about 2:1 to about 1:1, more preferably from about 1.8:1 to about 1.2:1, and most preferably in the range from about 1.7:1 to about 1.6:1. It has been found that these ratios provide a formulation which yields a good viscosity for applying formulation to form the supporting layer, as well as to remain on top of the latex paper until a cure can be effected. In general, the viscosity of the overall formulation should be controlled so that upon application of the substrate, it will not absorb into the substrate, but remain on top until a curing of the support layer can be effected.

The UV photoinitiator which is part of the formulation can be any suitable UV photoinitiator. The photoinitiator allows the formulation to be cured once applied to the substrate. An example of an appropriate UV photoinitiator is an alpha hydroxy ketone available commercially under the trademark DARAOCURE 1173. The amount of photoinitiator employed in the formulation is an amount effective for initiating the curing of the support layer.

The fourth component of the formulation used to prepare the support layer is a polyether. The polyether has been found to be an important component in that it appears to be labile toward corona treatment, and thus upon corona treatment sites are believed to be generated on the polyether to allow better bonding with the ink jet layer. Thus, the presence of the polyether is very important to the enhanced adhesion realized by using the formulation of the present invention to form a support layer for an ink jet receiving layer. Preferred polyethers are the polyglycols, such as polyethylene glycol and polypropylene glycol. Mixtures and copolymers can be employed. The amount of polyether employed in the formulation generally ranges from 2 to 10 weight percent, more preferably from 3 to 7 weight percent, and most preferably from 4 to 6 weight percent of the formulation.

A suitable formulation for use in preparing a support layer is exemplified in Table 1 below:

TABLE 1

| MATERIAL | wt % |
|---|---|
| DAROCURE 1173 (Photo Initiator) | 5.13 |
| ETHOXYLATBD HDODA (ethoxylated hydroxydioxanediacrylate)-diluent | 7.32 |
| PBG-1000 (polyethylene glycol - Mw 1000) | 5.0 |
| OPTICAL BRIGHTENER | .0095 |
| POLYESTER ACRYLATE (tetrafunctional) | 52.3 |
| EPOXY ACRYLATE (bisphenol A epoxy diacrylate) | 30.12 |
| TOTAL | 99.88 |

In the foregoing formulation, the ethoxylated HDODA is an ethoxylated hydroxy dioxanediacrylate available from HENKEL Corp. as RCC 13-361; the polyethylene glycol PEG-1000 is available from Dow under the tradename CARBOWAX 1000; the optical brightener is available from Ciba Geigy as UVITEX OB; the polyester acrylate is available from HENKEL Corp. as RCC 13-429; and the epoxy acrylate is available from HENKEL Corp. as PHOTOMER 3015.

The foregoing formulation can be applied to a substrate, preferably a non-yellowing, bright, white, latex coated paper base, which when coated at ~1#/1000 $ft^2$ (<5$\mu$) on a latex coated paper substrate and UV radiation cured, the formula gives a film layer whose surface has a high gloss(>60%@ 20° angle). After corona treatment, this coating acts as a glossy support layer and has excellent adhesion to subsequent ink jet receiving layers. It also provides the hand (feel) of a high quality photographic base. Electron Beam radiation cure is not as beneficial as UV curing to this process. Various electron beam radiation levels (e.g. 2–4 megarads) cause cure of the coating but a blooming or a fogging affect of the glossy coating due to migration of the polyethylene glycol occurs within 24 hours and discoloration of the paper substrate can occur as well.

Most UV cured systems are very hydrophobic and as a result have relatively low surface energy (<36 dynes/cm). Wetability and adhesion are critical to receiving many of the different types of aqueous ink jet coatings. Subsequent in-line corona treatment of this layer raises the surface energy (>45 dynes/cm) enough to give excellent adhesion to subsequent aqueous ink jet type coatings. Corona treating a coating without polyethylene glycol in the formulation does not increase the surface tension significantly.

The yellowing characteristics of the coatings of the present invention are negligible. The formulation has been found to exhibit excellent characteristics in this respect.

The coating can be applied to a substrate by reverse or direct gravure at 1–1.4#msf (5–7$\mu$) and cured by UV radiation (Fusion "H" Bulb) to give a high gloss of >60@20°. Any conventional substrate can be used, but the present invention has particular applicability to the use of a latex coated paper (photobase paper) substrate. After corona treatment, an aqueous ink jet image coating can be applied and dried above 220° F. without wetting defects caused by the radiation cured layer. The adhesion of the glossy support layer to the paper substrate and the ink jet receiving layer has been found to be excellent. An ink jet recording material with its various layers in accordance with the present invention is shown in the Figure of the Drawing.

Any conventional ink receiving layer can be coated onto the support of the present invention. The ink receiving layer generally comprises a polymeric binder, which can be a mixture of polymers. The ink receiving layer can also comprise solid particulates such as pigments. The addition of such solid particulates can be added in order to obtain a coating that works well for both dye based and pigmented ink systems. Solid particulates that are preferred include silica particulates, and in particular small particle sized hydrated silica. Such silica can be obtained, for example, from Grace Davidson. Another type of preferred particulate that gives both good waterfast and print quality properties is synthetic calcium silicate. The use of the calcium silicate such as commercially available Hubersorb 600 from J. M. Huber is preferred as such a calcium silicate has a very high oil absorption. Additionally, boehmite alumina can also be used.

The ink receiving layer can be coated onto the support of the present invention using any conventional coating process or method. A mixture of the polymers/particulates, generally in a coating solution of suitable viscosity for coating, is simply coated onto the support using a coating rod or other suitable method. Once coated, the coating can be dried using any conventional technique, such as an air drying or oven drying.

The Figure of the Drawing depicts a preferred embodiment of the present invention. Depicted in the Drawing is an ink jet photobase with glossy UV cured support layer. The substrate 1 is a latex coated paper. The UV cured glossy layer 2 prepared from the formulation of the present invention is coated onto the substrate. The thickness of the UV cured layer preferably ranges from 2 to 7 microns.

The ink jet receiving layer 3 is coated on top of the UV cured layer. The ink jet receiving layer can be applied at any conventional thickness, but is preferably applied in the range of from 10 to 15 microns, and is most preferably around 12 microns in thickness. It is most preferred that the ink jet receiving layer is an aqueous based composition.

The invention will be illustrated in greater detail by the following specific examples. It is understood that these examples are given by way of illustration and are not meant to limit the disclosure or the claims that follow. All percentages in the examples, and elsewhere in the specification, are by weight unless otherwise specified.

Example 1

The formulation of Table 1 was prepared with low shear blending equipment. The 100% solids formulation was then hand drawn down with a #2.3 wire rod (ct. wt. Range 3–4#/msf) and cured with lab radiation equipment utilizing "H" type fusion microwave bulbs. The cured glossy layer was flexible and had the hand of a gelatin type photographic paper. The gloss was above 60@20°. The surface energy of the glossy coating was ~36 dynes/cm. After hand corona treatment with an Electro-Technic Products, Inc. model BD-20 unit, the surface energy was ~46 dynes/cm.

This hand sheet was then coated with an ink jet receiving formulation comprised of a 10% solids gelatin based formulation. The formulation leveled out well with no repellencies visible. It was dried for 4 min. at 250° F. The resulting glossy hand sheet had a gloss >55@20°.

The adhesion was tested by scoring the coating with a sharp razor knife in a cross hatch design. A piece of #810 scotch tape was placed over hatch marks and rubbed with pressure. Then it was pulled away and the result was that both the ink jet coating attached to the UV cured coating and some of the paper tore away. Without corona treatment the ink jet receiving layer delaminates easily when the tape is applied and then pulled away. This coating was also made on a polyester substrate and a latex coated paper and subjected to an accelerated 5 year indoor exposure on a HPUV machine. No significant yellowing of the coating was observed.

Example 2

The formulation of Table 1, without photoinitiator, was prepared with low shear blending equipment. The 100% solids formulation was then drawn down with a #2.3 wire rod and cured with an Electron Beam radiation (2 Mega Rads/110 KV) equipment. The cured layer containing the polyethylene glycol mwt. −1000 was glossy, flexible and had the hand of a gelatin type photographic paper surface. However, a foggy appearance was noticed on the surface of the coating after 1 day. The paper substrate turned slightly blue grey on both the front and back surface.

A formulation similar to that of Table 1 was made but instead, Methoxy Polyethylene Glycol 550 Methacrylate was substituted for the PEG-1000. When exposed to the same EB radiation the coating cured and the base was described as above. A foggy appearance was not detected when this substitution was made.

This formulation, when UV cured, turned slightly yellow, and hence was considered unacceptable for photographic quality uses.

Example 3

The UV formulation was prepared, coated and cured as in Example 1. The UV glossy coating was then corona treated by a lab unit as above. Then an ink jet receiving layer comprised of an aqueous polyvinyl alcohol binder was coated and dried as above.

This coating was subjected to the identical adhesion test as above. The ink jet receiving layer and the UV cured layer plus some paper fiber came off the hand sheet. This demonstrates the excellent adhesion of the ink jet receiving layer to the glossy support layer.

While the invention has been described with preferred embodiments, it is to be understood that variations and modifications may be resorted to as will be apparent to those skilled in the art. Such variations and modifications are to be considered within the purview and scope of the claims appended hereto.

What is claimed is:

1. A support for an ink jet recording material, comprising a paper based substrate and a cured resinous coating layer on the substrate, with said cured resinous coating layer being obtained by exposing a coating composition comprised of a polyester tetraacrylate, a diacrylic ester, an ultraviolet radiation photoinitiator and polyethylene glycol, to ultraviolet light.

2. The support of claim 1, wherein the coating composition further comprises an optical brightener and/or an adhesion promoter.

3. The support of claim 1, wherein the photoinitiator is an alpha-hydroxy ketone.

4. The support of claim 1, wherein the substrate is a latex coated paper substrate.

5. The support of claim 1, wherein the cured resinous coating layer on the support has been corona treated.

6. A method of preparing a support for an ink jet recording material, comprising coating a substrate with a resinous coating composition comprised of a polyester tetraacrylate, a diacrylic ester, an ultraviolet radiation photoinitiator and polyethylene glycol to provide a resinous coating layer on the substrate, curing the resulting resinous coating layer by exposing said coating layer to ultraviolet light; and corona treating the cured resinous coating layer.

7. The method of claim 6, wherein the coating composition further comprises an optical brightener and/or an adhesion promoter.

8. The method of claim 6, wherein the photoinitiator is an alphahydroxy ketone.

9. The method of claim 6, wherein the substrate is a latex coated paper substrate.

* * * * *